Jan. 7, 1936.  C. W. VOGT  2,027,257
CUTTER FOR BARS OF ICE CREAM OR THE LIKE
Filed June 23, 1934   4 Sheets-Sheet 1

INVENTOR
Clarence W. Vogt
BY
ATTORNEYS

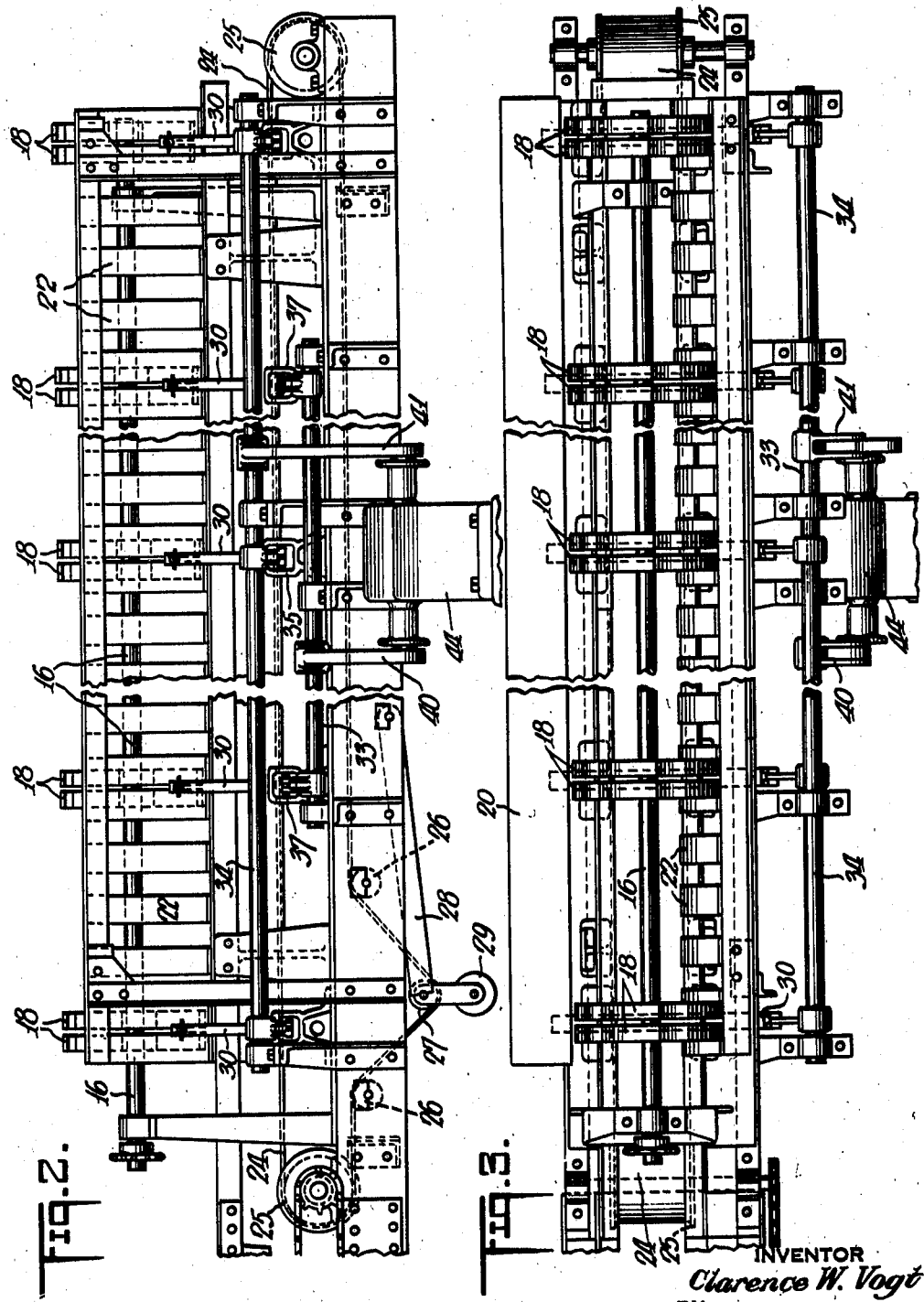

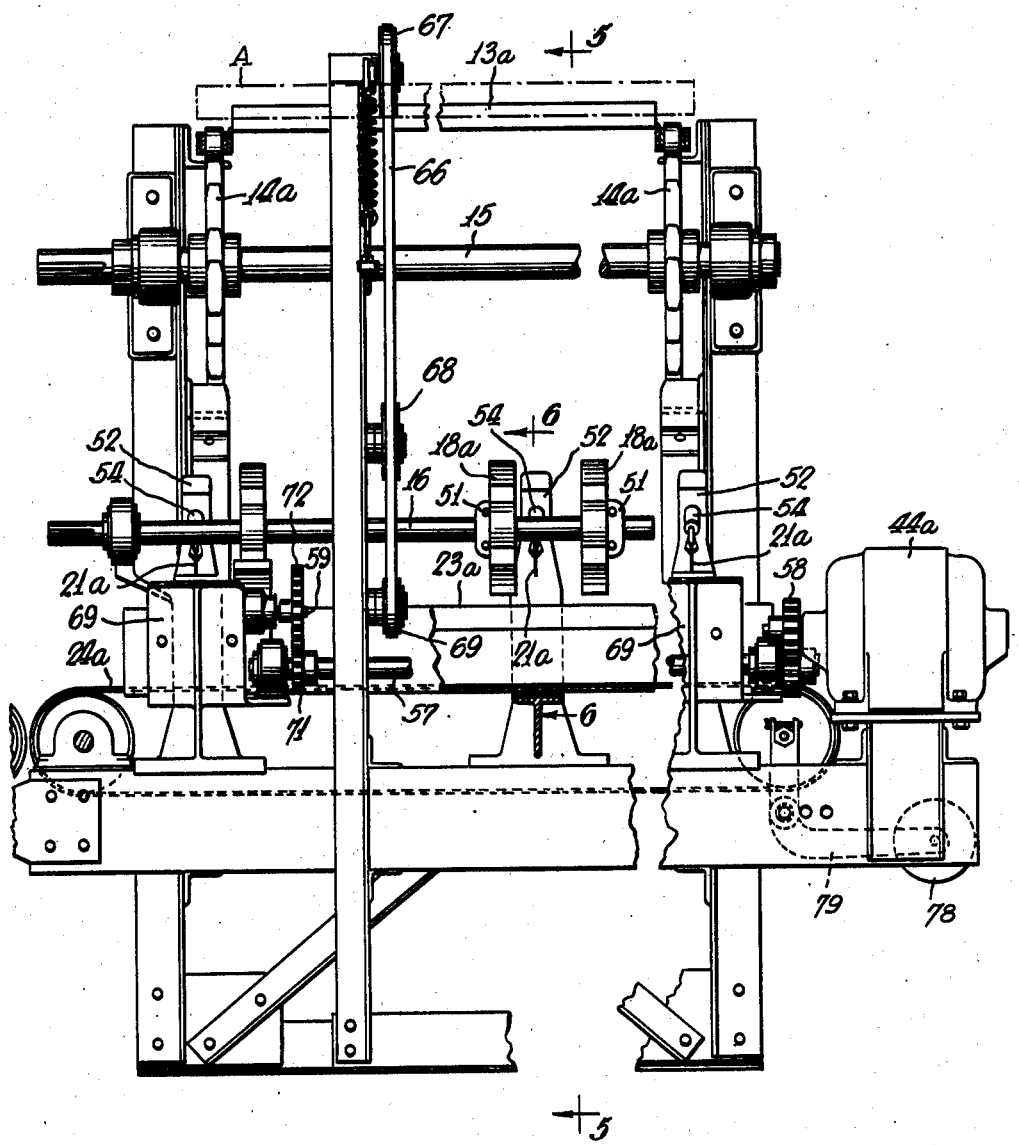

Jan. 7, 1936.  C. W. VOGT  2,027,257
CUTTER FOR BARS OF ICE CREAM OR THE LIKE
Filed June 23, 1934  4 Sheets-Sheet 4
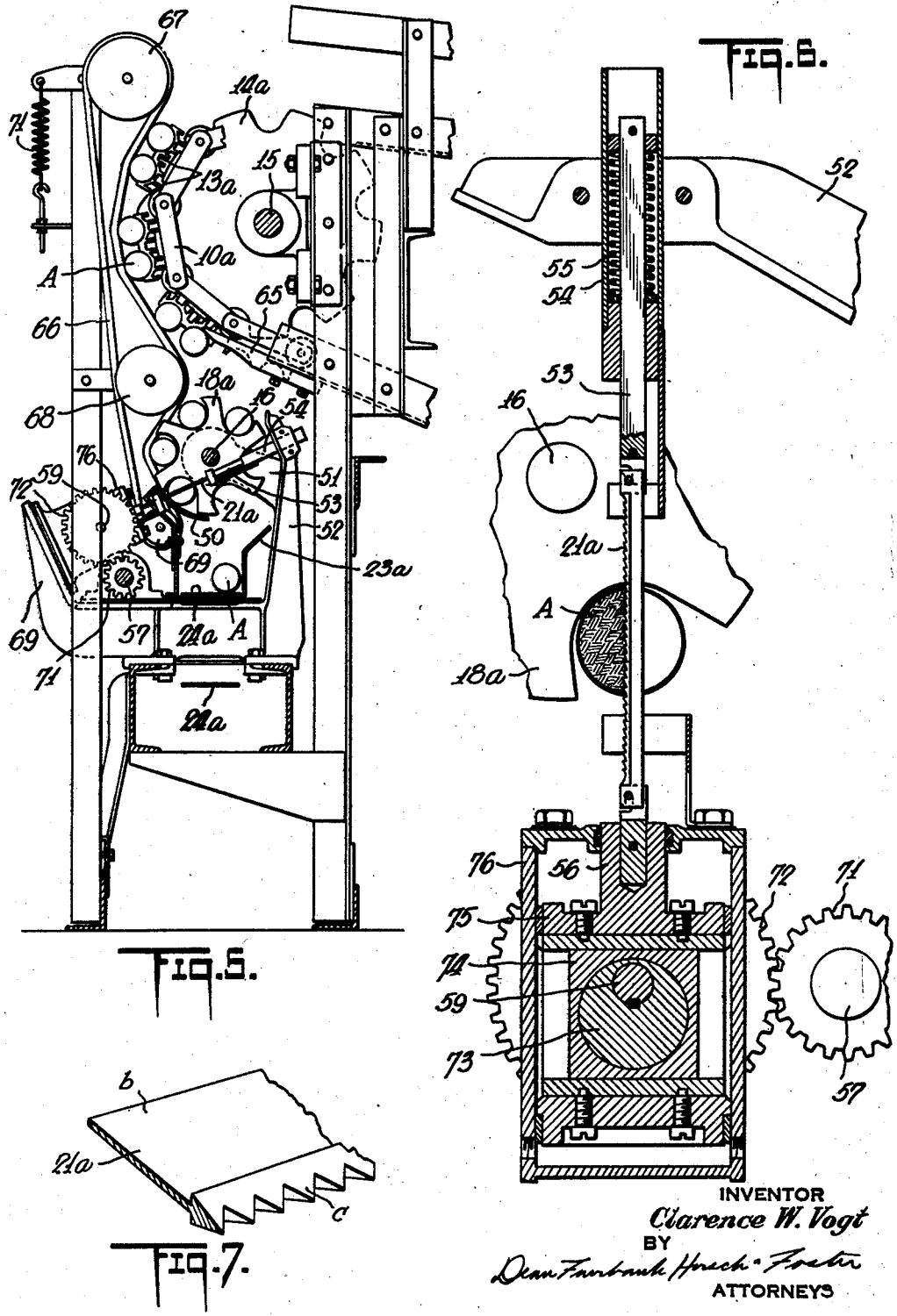
INVENTOR
Clarence W. Vogt
BY
Dean Fairbank Hirsch Foster
ATTORNEYS Patented Jan. 7, 1936

2,027,257

UNITED STATES PATENT OFFICE 2,027,257

CUTTER FOR BARS OF ICE CREAM OR THE LIKE

Clarence W. Vogt, Louisville, Ky., assignor to Vogt Processes, Incorporated, Louisville, Ky., a corporation of Delaware Application June 23, 1934, Serial No. 732,048

4 Claims. (Cl. 107—22)

This invention relates to apparatus for cutting bars or rods into shorter sections, and more particularly to that type of apparatus in which the bar is moved laterally past a plurality of cutters in parallel planes so as to cut it simultaneously into a plurality of sections of the desired and predetermined length.

Although the invention may in different embodiments be employed for cutting bars of a wide variety of materials the embodiments hereinafter described are designed particularly for use with bars of a comestible or of a plastic or easily cut material, as distinguished from metal or other hard material. Merely as an example, the apparatus may be employed for cutting peripherally wrapped bars of ice cream, butter, margarin or the like, which bars may be made by the apparatus disclosed in my prior Patents 2,006,375 and 2,006,376, issued July 2, 1935. The shorter sticks or lengths produced by the use of the apparatus embodying the present invention may be further cut up by the apparatus disclosed and claimed in application Serial No. 658,264, filed Feb. 23, 1933, and the final resulting sections may be of the character shown and claimed in the Vogt Patent 1,906,183, issued April 25, 1933, 1,950,643, issued Mar. 13, 1934 or 2,001,477, issued May 14, 1935.

Obviously the apparatus may be used for cutting up bars or other materials, made in other ways and later treated or used in other ways.

As one feature of the present invention the bars are fed laterally by a conveyer which may form a part of the hardening apparatus and they move downwardly therefrom past the cutters onto another conveyer for removing the sections endwise from the hardening chamber.

As another feature the cutters are composed of narrow reciprocating saw blades having comparatively short movement so that they have the minimum amount of smearing action on a multilayer or multi-flavored bar of a comestible and work their way through the bar with the minimum removal of material analogous to sawdust.

As another feature the saw blades are movable back and forth in a horizontal direction so that gravity aids in feeding the bars through the cutting mechanism.

As a further feature the carrying members are arranged in pairs closely juxtaposed to each cutter upon opposite sides thereof so as to effectively support the bar during the cutting action.

As a further feature the rotors carrying the bars have their pockets open at the outer ends so that the bars may drop by gravity into the pockets when the latter are at the upper side, and guards are provided for holding the bars in the pockets as they move downwardly past the cutters which are disposed below the axis of the rotors.

As a further feature the bars are held in the carrying members by endless flexible members of the nature of belts and which travel with the bars, so as to prevent any rubbing or friction on the bars which might tend to unwrap or loosen paper or other coverings on the bars.

Various other features of importance will be pointed out hereinafter or will be apparent from a consideration of the following description and the accompanying drawings.

In these drawings:

Fig. 2 is a front elevation of the form shown in Fig. 1,

Fig. 3 is a top plan view of the same form,

Fig. 4 is a front elevation of another form, certain of the parts being shown in section, Fig. 5 is a vertical section on the line 5—5 of Fig. 4, Fig. 6 is a sectional view showing one of the cutters and the operating mechanism therefor, but on a very much larger scale, and Fig. 7 is a perspective view of a portion of one of the saws, but on a very much enlarged scale.

Figure 1:
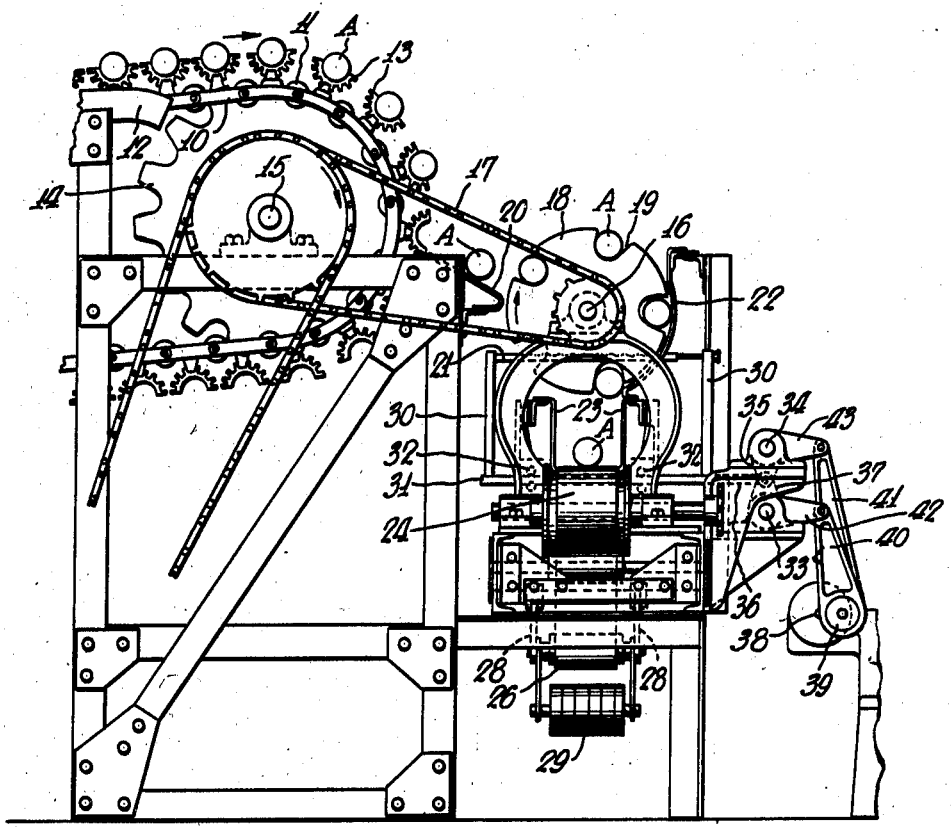
Fig. 1 is an end view of an apparatus embodying the present invention.

The construction in Figs. 1 to 3 inclusive is that illustrated in Figs. 16 and 18 to-23 of companion application Serial No. 678,624, filed July 1, 1933. The bars are delivered to the cutting mechanism by means of two or more parallel chains 10 having rollers 11 on the pins connecting the links together so that the chains may readily advance along a support 12. The chains carry a plurality of trough or channel shaped carriers 13 each adapted to support a bar A of the material to be cut. The conveyer shown is adapted for conducting the bars through a hardening chamber maintained at a very low temperature so that the bars in passing through the chamber will become frozen or hardened to the desired extent.

To facilitate the radiation of heat from the bars each carrier is shown as provided with a plurality of longitudinally extending fins or flanges on the outer or convex side thereof.

In the accompanying drawings the hardening chamber is not shown, but is mounted at the left of the parts shown in Fig. 1 so that the upper run of the conveyer emerges from the hardening chamber at the delivery end and the lower run returns through the hardening chamber to the point where the bars are delivered onto the conveyer one at a time as the successive carriers 13 pass beneath the depositing mechanism. The chains pass over sprocket wheels 14 having the gaps between the teeth of such size and shape as to receive the rollers 11 of the chains.

As the conveyer passes around the sprocket wheels the carriers in succession reach a point where the inclining or tilting of the carrier permits the bar to roll out. The sprocket wheels are mounted upon a transverse shaft 15 and parallel thereto is another shaft 16 driven in timed relationship with the shaft 15 by a chain 17 on sprocket wheels of the appropriate relative sizes. On the shaft 16 is mounted a plurality of pairs of transfer wheels 18 each having a series of notches, recess or pockets 19 in the periphery thereof. These pockets are spaced apart and the number of pockets around the periphery is such in respect to the sizes of the sprocket wheels for the chain 17 and the spacing of the carriers 13 on the endless conveyer that the rate of circumferential travel of the pockets is substantially the same as the rate of movement of the carries 13 through the hardening chamber.

Between the conveyer and the series of pairs of carrier wheels 18 there is provided an inclined support 20 so positioned that as the conveyer passes over the sprocket wheels 14 the bars A will roll or drop therefrom onto the support 19 and will move down this support by gravity until they engage the peripheries of the carrier wheels 18. This inclined support 20 is so positioned on its upper end in respect to the carriers 13 that in case the bars A become frozen to the carriers in the hardening room the support will act to dislodge them from the carriers. The lower end of the support is so positioned that the bars cannot fall between the end of the support and the carrier wheels.

As the carrier wheels are rotated in a clockwise direction as shown in Fig. 1, the bars will move by gravity into the pockets when they reach a position opposite the lower end of the inclined support 20.

The two carrier wheels of each pair are spaced apart to leave therebetween only sufficient clearance to accommodate the reciprocating saws 21. The successive pairs of carrier wheels with interposed saws are spaced apart to a distance depending upon the length of the sections into which the bar is to be cut. Merely as an example the bars may be approximately 14 feet long and there may be 9 of the saws for cutting the bars into sections approximately 20 inches long with short waste sections cut from each end of the bar. As previously noted these 20 inch sections may be later cut up into individual service portions by another mechanism and the parts cut from the end of the bar may be melted and returned to the freezer for reprocessing.

The saws 21 are mounted below the shaft 16, but at a sufficient distance above the lower sides of the wheels so that the wheels positively carry the bars past the saws and the saws cut all of the way through each bar. To hold the bars in the pockets of the wheels during the downward movement of the bars past the saws, there are provided inclined guards 22 disposed closely adjacent to and substantially parallel with the peripheries of the wheels. These guards are positioned in the same transverse planes as the wheels so that they hold and support the bars closely adjacent to the lines of cut and there may be and preferably is provided a plurality of similar additional guards between adjacent pairs of wheels so as to support the bars at closely spaced points along the length thereof.

Directly below the shaft 16 is a U-shaped trough 23 into which the sections cut from the bars drop after they have passed the saws and have also passed the lower ends of the guards or guides 22. A suitable delivery conveyer is provided for carrying away the sections as they fall into the trough. This conveyer may be in the form of a belt 24 passing around a pair of pulleys 25, the belt being of approximately the same width as the trough 23, and the upper run of the belt being within and extending lengthwise of said trough. The bottom of the trough may be omitted and the belt itself form the bottom wall of the trough in which case the side walls of the trough serve merely as guides to insure the sections falling onto the belt and as means for preventing the bars from rolling off during the movement of the belt. The lower or return run of the belt is below the trough and may be provided with any suitable form of belt tightener to keep the belt taut. As shown the belt passes over a pair of idlers 26 and a third idler 27 rests upon the belt between the two idlers 26. This idler 27 may be carried by a pair of pivoted links 28 and a weight 29 may be suspended from the links below the idler 27. The weight may be made up of a plurality of sections so that the required number of sections may be employed to give the belt the required tautness.

The saws are each carried between opposite upstanding arms 30 of a U-shaped frame, the lower member 31 of which is beneath the belt 24. Each saw carrying frame is supported and guided so as to permit it to move back and forth in a horizontal direction parallel to the length of the saw. The brackets which support the trough 23 may have rollers 32 constituting such saw frame supporting and guiding means.

In the construction shown in Figs. 1, 2 and 3, the means for reciprocating the saws is such that while each alternate saw is moving in one direction the remaining saws will be moving in the opposite direction, thus counterbalancing the lateral thrust on the bar resulting from the action of the saws. The saw reciprocating means includes a pair of shafts 33, 34 spaced apart in the same vertical plane and mounted for simultaneous oscillation. The upper shaft 34 has depending arms 35 connected to extensions 36 on each alternate saw frame, and the lower shaft 33 has similar upwardly extending arms 37 pivotally connected to the remaining saw frames. The pivotal connections for both the depending arms 35 and the upwardly extending arms 37 are in the same plane, and means are provided for oscillating the rock shafts simultaneously in the same direction so that the arms will be moved simultaneously in opposite directions. This oscillating means includes a shaft 38 having a pair of cranks 39 connected by crank arms 40 and 41 to outwardly extending arms 42 and 43 on the two rock shafts.

The shaft 38 may be driven at comparatively high speed by a motor 44 so that the saws are operated at comparatively high speed. Due to the short length of the arms 35 and 37 and the comparatively short angular movement of the rock shafts the range of movement of the saws will be comparatively short and preferably considerably less than the diameter of the bars A.

The conveyor belt 24 may be operated at such a speed that all of the sections cut from one bar will be moved through a distance equal to the total length of the bar during the period between the cutting operation on successive bars so that all of the sections of one bar will be removed from beneath the saws before the sections of the next bar are dropped on. Thus all of the sections will be delivered endwise and in succession and as a comparatively continuous row of sections. Obviously the belt 24 may be run at very much lower speed if desired and operate only sufficiently fast to keep the bar sections from piling up in the trough.

The cutting mechanism is preferably mounted within the refrigerating chamber and the belt 24 may either extend out of the chamber or deliver to another conveyor which takes the product from the chamber. The belt 24 and the conveyor to which it delivers may be spaced a short distance apart so that the short sections trimmed from the ends of the long bar may drop between the conveyors, whereas the main lengths cut between the cutters bridge across the gap and are delivered for packing, further subdivision or storage.

The construction shown in Figs. 4, 5 and 6 is designed to effect economizing of space in the hardening room and a simplification and improvement of many of the details. This apparatus may be used in connection with the hardening mechanism shown in application Serial No. 723,454, filed May 2, 1934, and may be mounted directly in the frame of the apparatus shown in said application. The conveyor 10a for delivering the bars to be cut passes over a sprocket wheel 14a and includes links somewhat longer than those shown in Fig. 1 and each having a duplex carrier element 13a for supporting two of the bars A.

The carrier wheels 18a are mounted almost directly beneath the sprocket wheels 14a so as to economize in space and permit the bars A to drop directly from the conveyor onto the carrier wheels 18a. Thus the inclined support 28 is omitted and in place thereof there is provided a plurality of curved guards 50 for holding the bars in place on the conveyor until they reach a point below the shaft 15.

The carrier wheels are mounted for rotation in a counterclockwise direction, and the shaft 16 of the carrier wheels is mounted in brackets 51 extending laterally from an upstanding frame member 52. The upper end of this frame member 52 or fingers 65 on the main frame may terminate closely adjacent to the path of movement of the conveyor 10a so as to insure dislodging of the bars therefrom, and permit them to drop onto the carrier wheels.

For holding the bars A in place while passing around the sprocket wheels 14a and being carried by the carrier wheels 18a there is provided a series of belts 66 so mounted that they substantially follow portions of said wheels. As shown there are provided idler pulleys 67, 68 and 69, the pulleys 67 being above the sprocket wheels, the pulleys 68 being partly between the sprocket wheels and the carrier wheels, and the pulleys 69 being practically below the carrier wheels. One of the pulleys for each belt, for instance the upper pulley, is mounted on a pivoted arm 70 provided with a spring 71 for holding the belt taut. As the sprocket wheels and carrier wheels rotate, the belts hold the bars A in place, and as the pulleys are not positively driven, the belts may travel with the bars rather than the bars sliding along stationary guides. Thus there is no liability of the wrappers on the bars being loosened or displaced during transit. There may be any desired number of these belts along the length of the bars.

Beneath the carrier wheels 18a is a trough 23a into which the sections fall, and within this trough is a conveyor belt 24a. The outer side wall of the trough may carry guides beyond the belts for holding the bars A in place past the saws and then letting the sections drop into the trough.

The saws 21a are mounted beneath the shaft 16 and preferably at an angle to the horizontal. One end of the saw is connected to a plunger 53 in a casing 54 supported by the frame members 52 and is continuously pulled in one direction by a spring 55. The plunger 53 may be square or of any desired non-circular cross-section to prevent rotation or oscillation and to hold the saw in a definite plane. Although the saws may be of any desired shape they are preferably very thin and comparatively narrow.

In Fig. 7 there is shown a perspective view of a portion of a saw on a greatly enlarged scale. The rear or body portion b of the saw is thinner than the portion c adjacent to the edge so as to reduce friction and to reduce the liability of the cut portions welding together in the rear of the saws. The saws may have any desired shape of teeth.

In practice the total width of the saw need not be over one-third of an inch and the maximum thickness not over .02 inch.

The opposite end of the saw is mounted in a reciprocating head 56 which is intermittently pulled in one direction while returned and kept taut by the spring. The saws are driven by a motor 44a driving a shaft 57 through gearing 58. The shaft extends parallel to and outside of the trough 23a and drives a series of saw actuating counter shafts 59 by gearing 71, 72, each shaft 59 being mounted in a bracket on a frame member 61. Each shaft 59 has an eccentric 73 mounted on a block 74 slidable laterally in a frame 75 connected to the saw head 56. The frame 75 is mounted to reciprocate in a guide 76 and parallel to the direction of movement of the saw. This connection between each shaft 59 and its saw 21a is thus of the Scotch-yoke type. Any other suitable form of driving connection may be used which will and preferably does guide the saws.

By means of the constructions illustrated the long bars are removed from the hardening conveyer at the end of the run of the latter, transferred to a plurality of carrier wheels, supported by said wheels while moved past the saws, and the sections are deposited on a conveyer which carries away the sections in an endwise direction so that they may move out of the low temperature chamber through an opening of the minimum size and with the least loss of refrigeration from the chamber.

Having thus described the invention, what is claimed as new and is desired to be secured by Letters Patent is:

1. An apparatus for cutting bars into sections, including a pair of wheels having parallel vertically spaced axes and operating in succession to advance the bars, and a flexible belt having a portion substantially following the peripheries of the two wheels in succession for preventing disengagement of the bars during their advancing movement by the wheels.

2. An apparatus for subdividing bars of frozen ice cream into sections, including a pair of rotary members having parallel axes in superposed relationship, the lower of said members having a series of pockets in the peripheries thereof, and the upper of said members having means for delivering successive bars and dropping them from the lower portion of the upper member to the upper portion of the lower member, means for rotating said members in timed relationship and in the same direction, an endless belt following portions of the peripheries of both of said members to retain said bars in position in respect to said members during downward movement with said members, and means for cutting the bars into sections while being carried downwardly by the lower of said members.

3. An apparatus for cutting ice cream bars into sections, including an endless conveyer having a series of flights for delivering successive bars, a rotary member around which said conveyer passes, a series of transfer wheels disposed beneath said rotary member and each having a series of pockets in the periphery thereof, an endless belt having a portion of one run substantially following the contour of said rotary member to hold said bars in position on said conveyer during downward movement of the bars around said member and having another portion of said run substantially following the contour of said transfer wheels to hold the bars in position in said pockets during their downward movement with said wheels, a plurality of saws beneath the axis of said transfer wheels and above the lower peripheries of said wheels for subdividing said bars into sections while retained in said pockets, and a conveyer beneath said transfer wheels and movable in a direction parallel to the axis of the latter for delivering the successive sections endwise.

4. An apparatus for cutting ice cream bars into sections, including an endless conveyer having a series of flights for delivering successive bars, a rotary member around which said conveyer passes, a transfer wheel disposed beneath said rotary member and having a series of pockets in the periphery thereof, an endless belt having a portion of one run substantially following the contour of said rotary member to hold said bars in position on said conveyer during downward movement of the bars around said member and having another portion of said run substantially following the contour of said transfer wheel to hold the bars in position in said pockets during their downward movement with said wheel, and a saw beneath the axis of said transfer wheel and above the lower periphery of said wheel for subdividing said bars into sections while retained in said pockets.

CLARENCE W. VOGT.